US009300610B2

(12) United States Patent
Fioravanti

(10) Patent No.: US 9,300,610 B2
(45) Date of Patent: Mar. 29, 2016

(54) SYSTEM AND METHOD FOR SELECTING A FILE STORED ON A CLOUD SERVER

(71) Applicant: Google Inc., Mountain View, CA (US)

(72) Inventor: Ryan James Fioravanti, Ontario (CA)

(73) Assignee: Google Inc., Mountain View, CA (US)

( * ) Notice: Subject to any disclaimer, the term of this patent is extended or adjusted under 35 U.S.C. 154(b) by 236 days.

(21) Appl. No.: 13/829,307

(22) Filed: Mar. 14, 2013

(65) Prior Publication Data
US 2015/0200884 A1    Jul. 16, 2015

(51) Int. Cl.
*H04L 12/58*    (2006.01)

(52) U.S. Cl.
CPC .............. *H04L 51/08* (2013.01); *H04L 51/066* (2013.01)

(58) Field of Classification Search
CPC .... G06Q 10/107; H04L 12/585; H04L 12/58; H04L 12/581; H04L 12/5855; H04L 51/08; H04L 51/066
USPC .......................................................... 709/206
See application file for complete search history.

(56) References Cited

U.S. PATENT DOCUMENTS

| | | | | |
|---|---|---|---|---|
| 2002/0010748 A1* | 1/2002 | Kobayashi | ............... | H04L 12/58 709/206 |
| 2002/0016818 A1* | 2/2002 | Kirani | ............... | G06F 17/30902 709/203 |
| 2002/0087592 A1* | 7/2002 | Ghani | ............... | G06Q 10/10 715/239 |
| 2003/0152203 A1* | 8/2003 | Berger | ............... | H04L 12/58 379/93.24 |
| 2004/0177159 A1* | 9/2004 | Butterfield | ............. | G06Q 10/10 709/246 |
| 2004/0205582 A1* | 10/2004 | Schiller | ............... | H04L 12/5835 709/203 |
| 2004/0268246 A1* | 12/2004 | Leban | ................ | G06F 17/2247 715/239 |
| 2007/0052995 A1* | 3/2007 | Kudlu | ................... | G06F 3/1204 358/1.15 |
| 2007/0067397 A1* | 3/2007 | Tran | ..................... | G06Q 10/107 709/206 |
| 2010/0082713 A1* | 4/2010 | Frid-Nielsen | ......... | G06F 17/301 707/821 |
| 2013/0103742 A1* | 4/2013 | Hsi | ................... | G06F 17/30274 709/203 |

OTHER PUBLICATIONS

Launch Media, LLC, "Sparrow 1.4 Lets You Upload Attachments to the Cloud with CloudApp Integration," Oct. 5, 2011, <http://blog.launch.co/blog/sparrow-14--lets-you-upload-attachments-to-the-cloud-with-clo.html>.

* cited by examiner

*Primary Examiner* — Philip Chea
*Assistant Examiner* — Wuji Chen
(74) *Attorney, Agent, or Firm* — McDermott Will & Emery LLP

(57) ABSTRACT

A system and a method are disclosed for selecting a file stored on a cloud server. A connection is established to a cloud server. A list of files stored on the cloud server is received. The list provided for display in a graphical user interface of an electronic messaging application. A user selection of a file from the list of files is received and the selected file is transferred from the cloud server in response to receiving the selection of the file. The transferred file is then attached to an electronic message.

19 Claims, 5 Drawing Sheets

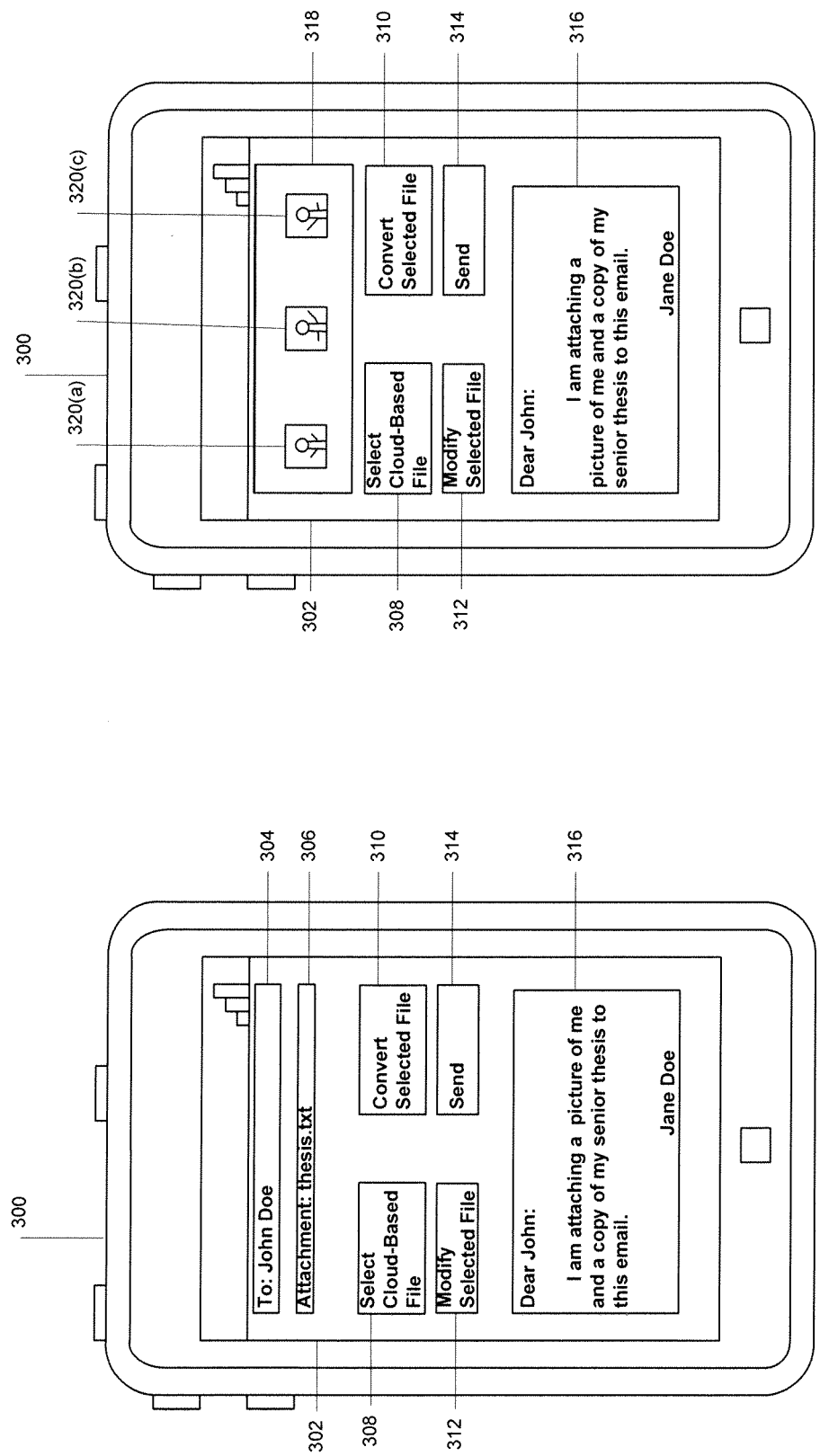

SYSTEM AND METHOD FOR SELECTING A FILE STORED ON A CLOUD SERVER

BACKGROUND

The subject technology generally relates to electronic messaging, and in particular, relates to attaching files stored on a cloud server to electronic messages.

A user who wishes to attach a file that is stored on a cloud server to an electronic message either must download the file and attach the file to the electronic message or must send a link of the location of the file within the electronic message. Downloading the file from the cloud server typically requires the user to leave an electronic messaging application to access the cloud server and download the file to the user's device before returning to the electronic messaging application to attach the downloaded file to an electronic message. This process is tedious for a desktop/laptop user and may be impossible for a mobile device user. Sharing the file using a link requires the recipient to have access to the cloud server storing the file and may require the user to share a password for accessing the cloud server with the recipient. Users may not wish to share their passwords with recipients and less technologically savvy recipients may have difficulty logging on to the cloud server and retrieving the file.

SUMMARY

According to one aspect of the subject technology, a method for selecting a file stored on a cloud server is provided. The method comprises establishing a connection to a cloud server. The method further comprises receiving a list of files stored on the cloud server. The method further comprises providing the list for display in a graphical user interface of an electronic messaging application. The method further comprises receiving a user selection of a file from the list of files. The method further comprises transferring the selected file from the cloud server in response to receiving the selection of the file. The method further comprises attaching the transferred file to an electronic message.

According to another aspect of the subject technology, an electronic messaging system is provided. The system comprises one or more processors, and a machine-readable medium comprising instructions stored therein, which when executed by the processors, cause the processors to perform operations comprising establishing a connection to a cloud server. The operations further comprise receiving a list of files stored on the cloud server. The operations further comprise providing the list for display in a graphical user interface of an electronic messaging application. The operations further comprise receiving a user selection of a file from the list of files. The operations further comprise transferring the selected file from the cloud server in response to receiving the selection of the file. The operations further comprise receiving a list of one or more file types for the user selected file. The operations further comprise receiving a user selection of one of the one or more file types. The operations further comprise converting the selected file to the selected file type. The operations further comprise attaching the converted file to an electronic message.

According to another aspect of the subject technology, a machine readable medium for selecting a file stored on a cloud server is provided. The machine readable medium comprising instructions stored therein, which when executed by a system, cause the system to perform operations comprising establishing a connection to a cloud server. The operations further comprise receiving a list of files stored on the cloud server. The operations further comprise providing the list of files for display in a graphical user interface of an electronic messaging application. The operations further comprise receiving a user selection of a file from the list of files. The operations further comprise transferring the selected file from the cloud server in response to receiving the selection of the file. The operations further comprise receiving a list of one or more file types for the user selected file. The operations further comprise receiving a user selection of one of the one or more file types. The operations further comprise converting the selected file to the selected file type. The operations further comprise attaching the converted file to an electronic message.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the subject technology as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology. In the drawings:

FIG. 3A illustrates a graphical user interface for an electronic messaging application.

FIG. 3B illustrates the graphical user interface of FIG. 3A, where files stored on a cloud server are displayed in response to a user action with respect to the first user control.

DETAILED DESCRIPTION

The detailed description set forth below is intended as a description of various configurations of the subject technology and is not intended to represent the only configurations in which the subject technology may be practiced. It will be apparent, however, that the subject technology is not limited to the specific details set forth herein and may be practiced without these specific details. In some instances, structures and components are shown in block diagram form in order to avoid obscuring the concepts of the subject technology.

In accordance with the subject disclosure, systems and methods for selecting a file stored on a cloud server are provided. The subject technology may be a part of an electronic messaging system that runs on a server. The subject technology has access to the user's files that are stored on a cloud server and can provide a user with a list of the user's files that are stored on the cloud server. In one example, the list may be provided for display in a graphical user interface of the user's electronic messaging application. The user may select a file from the list of files that the user wishes to attach to an electronic message.

The subject technology, upon receipt of the user selection, requests the cloud server to transfer the selected file. The subject technology may allow the user to specify a file type, or select a file type from a list of file types, and convert the selected file into the specified/selected file type if necessary. The subject technology may include additional features which allow the user to edit the selected file (e.g., crop or scale an image) before attaching the file to the electronic message. The transferred file is then attached to the electronic message.

Figure 1:
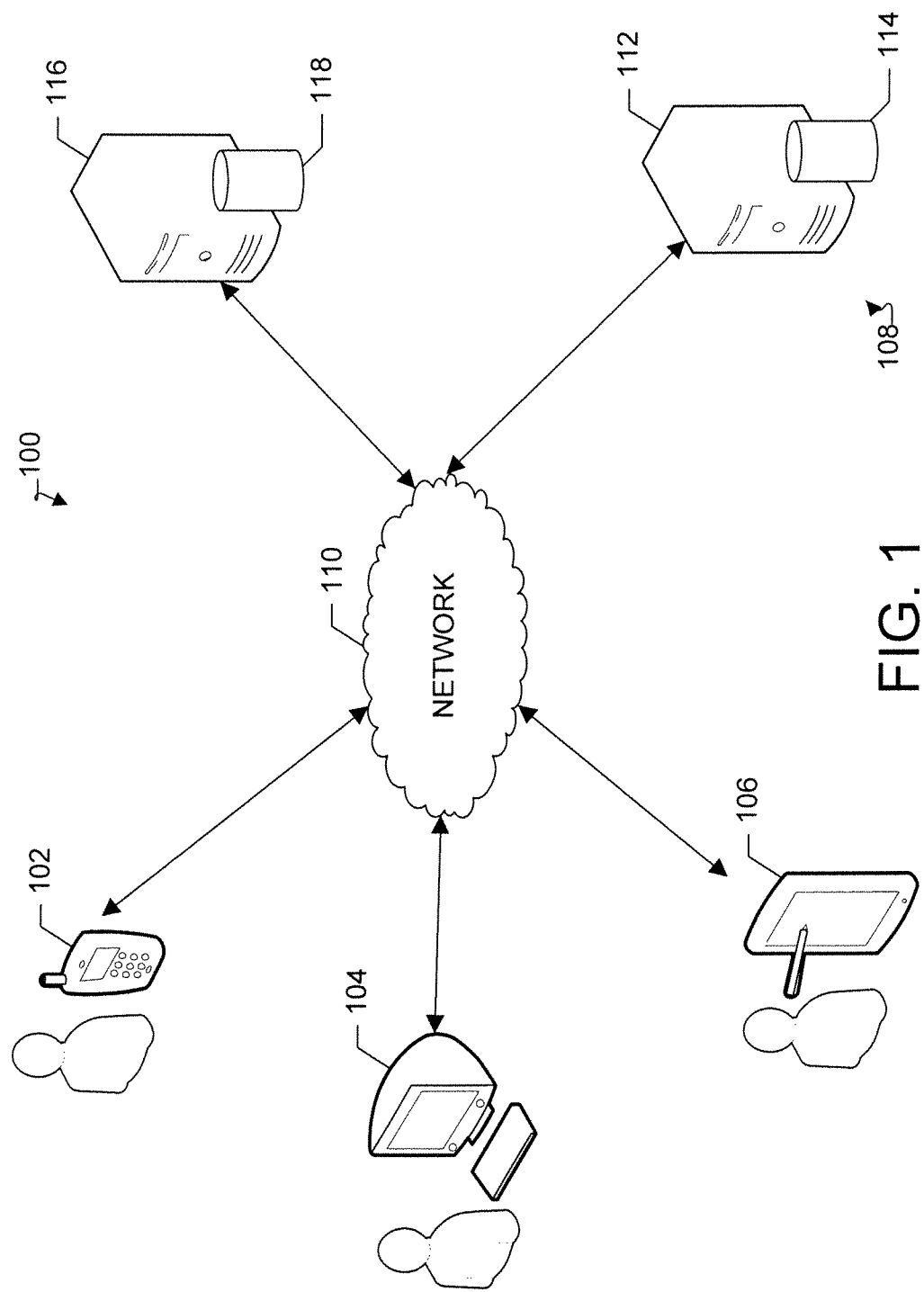
FIG. 1 illustrates an example network environment for selecting a file stored on a cloud server.

FIG. 1 illustrates an example network environment for selecting a file stored on a cloud server. Network environment 100 includes a number of electronic devices 102, 104, and 106 communicably connected to a server for an electronic messaging service 108 and a cloud storage system 116 by a network 110. Server 108 includes a processing device 112 and data store 114. Processing device 112 executes computer instructions stored in a computer-readable medium, for example, to access cloud storage system 116 for a user selected file that is stored on cloud storage system 116, transfer the user selected file from cloud storage system 116 to server 108, and attach the transferred file to an electronic message. Data store 114 includes storage systems that store user electronic messages. Cloud storage system 116 hosts files stored in data store 118 and is accessible to server 108 via network 110. Example types of files that are stored on cloud storage system 116 include image files, audio files, text files, etc., and may require a login credential to access.

Server 108 may be any system or device having a processor, memory, and communications capability for providing electronic messages to electronic device 102, 104, or 106. In one example, server 108 hosts an electronic messaging system that has access to user electronic messages and facilitates transmission of electronic messages between server 108 and electronic device 102, 104, and 106. In other examples, server 108 also hosts a cloud storage system that stores files transferred from electronic device 102, 104, or 106 and/or cloud storage system. User access to the electronic message system and the cloud storage system may require login credentials. Server 108 may represent more than one computing device working together to perform the actions of a server computer.

In some example aspects, electronic device 102, 104, or 106 includes any machine that supports an electronic messaging application, which has access to the user's electronic messages. Electronic devices 102, 104, and 106 may be mobile devices (e.g., smartphone devices, tablet computers, PDAs, and laptop computers), portable media players, desktop computers, or other computing devices. In the example of FIG. 1, electronic device 102 is depicted as a smartphone device, electronic device 104 is depicted as a desktop computer, and electronic device 106 is depicted as a PDA.

An application (e.g., a web browsing application, an electronic messaging application, etc.) running on electronic device 102, 104, or 106 has access to a user's electronic messages, which may be stored on server 108. The application provides a user interface for the user to interact with the user's electronic messages. Example interactions include but are not limited to viewing electronic messages, replying to electronic messages, composing new electronic messages, viewing a list of files that are stored on cloud storage system 116, requesting server 108 to attach a file located on cloud storage system 116 to an electronic message, assigning a priority status to select electronic messages, etc. The application may receive login information to access the user's files that are stored on a cloud storage location hosted by server 108 and/or cloud storage system 116. In one example, the application stores login credentials to access the user's files that are stored on cloud storage system 116 and, upon receipt of a user request to access a file that is stored on cloud storage system 116, provides the login information to server 108. Server 108 then uses the provided login information to establish a connection to cloud storage system 116.

Server 108, upon establishing a connection to cloud storage system 116, requests cloud storage system 116 to identify the user's files that are stored on cloud storage system 116 and provide server 108 and provide server 108 with a list of user's identified files. The list of the user's files are then provided to the user's electronic device 102, 104, or 106, where the list is provided for display in an interface of the user's application.

The application may provide a first user control, where the first user control provides visual indicators for each of the list of files that are stored on cloud storage system 116 for display in response to a user interaction with the first user control. Server 108, upon receipt of a user selection of a file from the application, requests cloud storage system 116 to transfer the selected file to server 108.

The application may provide a second user control in the user interface, where the second user control is configured to display file types available for conversion of the selected file. Examples of these file types include JPEG, PDF, etc. The application may receive a user selection of one of the file types via the second user control. The application may transmit a request to convert the selected file to server 108. Server 108, upon receipt of the request to convert the selected file to the selected file type, converts the selected file and attaches the converted file to the electronic message at the server. In another example, the conversion process takes place on cloud storage system 116 before the selected file is transferred from cloud storage system 116 to server 108 and attached to the electronic message.

The application may also provide a third user control in the user interface of the electronic messaging application, where the third user control is configured to display file modification options for the selected file. In one example, the file modification options for the selected file are provided for display in a graphical user interface of the application. The application may also receive a user selection of one of the file modification options via the third user control, and transmit the selected modification options to server 108. Example modifications include changing file size of a selected file, changing image resolution of the selected file, etc. Server 108, upon receipt of a modification option for the selected file, may modify the selected file based on the received modification option and attach the modified file to the electronic message. In another example, server 108, upon receipt of a modification option for the selected file, may request cloud storage system 116 to modify the selected file and transmit the modified file to server 108, where the modified file is attached to the electronic message at server 108.

Network 110 may include, for example, any one or more of a cellular network, a satellite network, a personal area network (PAN), a local area network (LAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
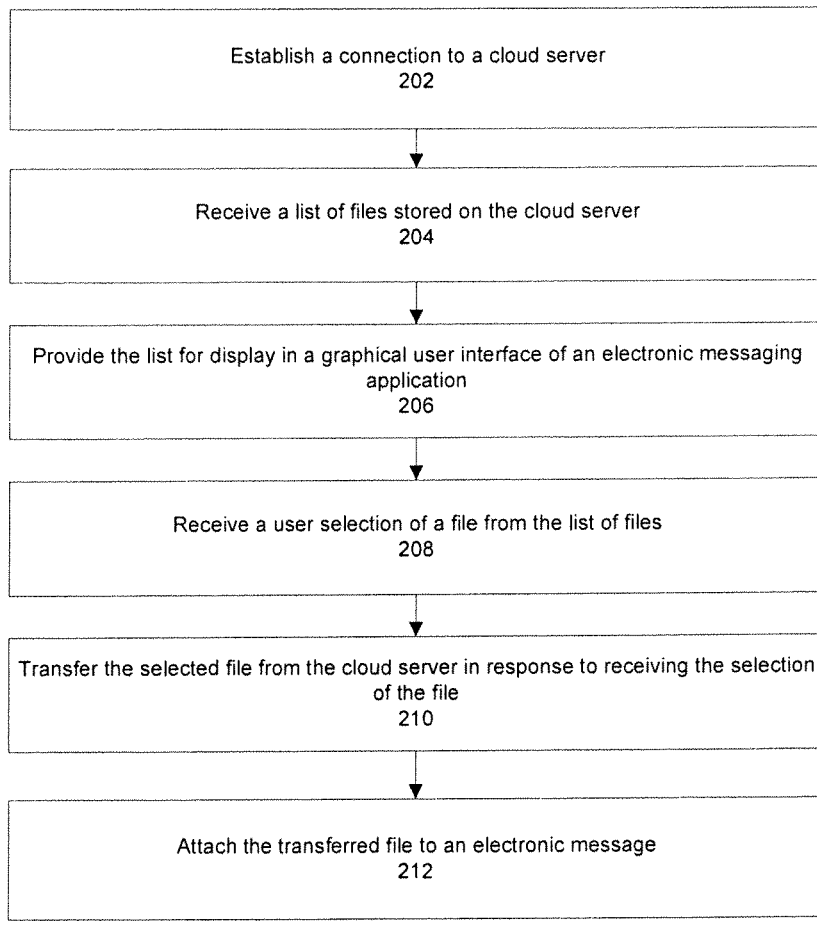
FIG. 2 illustrates an example process for selecting a file stored on a cloud server.

FIG. 2 illustrates an example process for selecting a file stored on a cloud server. Although the operations in process 200 are shown in a particular order, certain operations may be performed in different orders or at the same time.

An electronic messaging application running on an electronic device (e.g., a smartphone device, a laptop computer, a desktop computer, a tablet computer, a PDA, etc.) may provide an interface for displaying electronic messages that are hosted on a electronic messaging server. The application may also provide an interface for viewing user files that are stored on a cloud server and may transmit a request for the electronic messaging server to access the user's files that are stored on the cloud server in response to receiving a user request to access such files. In one example, a first user control is provided in a graphical user interface of the electronic messaging application, where the first user control is configured to display the files stored on the cloud server in response to a user action (e.g., a click action, a tap action, a hover action, a swipe action, etc.) with respect to the first user control. The electronic messaging application transmits a request to view the files stored on the cloud server in response to a user action with respect to the first user control.

In block 202, the electronic messaging server, upon receipt of a request to view files that are stored on the cloud server, establishes a connection to the cloud server. In one example, a verification of the user's login credential is required to access the user's files that are stored on the cloud server. In that case, electronic messaging server may receive the user's login credential, and provide the received login credential to the cloud server to establish a connection with the cloud server. In block 204, the electronic messaging server receives a list of files that are stored on the cloud server. In one example, the cloud server, upon verification of user login credential, identifies the user's files that are stored on the cloud server, generates a list of the user's files, and provides the list to the electronic messaging server.

In block 206, the electronic messaging server provides the received list for display in a graphical user interface of the user's electronic messaging application. The user may select a file among the list of files displayed in the graphical interface via a user action (e.g., a click action, a tap action, a hover action a swipe action, etc.) with respect to the displayed file. The electronic messaging application then transmits the user selection to the electronic messaging server, where the selection is received at the electronic messaging server in block 208.

In block 210, the electronic messaging server accesses the cloud server and requests the cloud server to transfer the selected file from the cloud server to the electronic messaging server. A selected file may be converted into another file type. A user indication to convert the selected file may be transmitted from the electronic messaging device to the electronic messaging server. In one example, the electronic messaging server, upon receipt of the user indication to convert the selected file to another file type, obtains a list of file types that the selected file may be converted into and provides the list of file types to the electronic messaging application.

The electronic messaging application may provide a second user control in the user interface of the electronic messaging application, where the second user control is configured to display file types for the user selected file in a graphical user interface in response to a user action (e.g., a click action, a tap action, a hover action, a swipe action, etc.). In a case where the user selects an image file, the second user control may display a selection of compatible image-based file types (e.g., JPEG file type, IMG file type, etc.) in response to a user action with respect to the second user control. In a case where the user selects a text-based file, the second user control may display compatible text-based file types (e.g., PDF file type, TXT file type, etc.) in response to a user action with respect to the second user control.

A user selection of a file type for the selected file is then transmitted from electronic messaging application to electronic messaging server, and the file is converted to the selected file type prior to being attached to the electronic message. In one example, the conversion process takes place on the electronic messaging server, where the selected file is converted into the selected file type. In another example, the electronic messaging server provides the cloud server with the user selected file type and requests the cloud server to convert the file into the selected file type. The electronic messaging server then requests the cloud server to transfer the converted file to the electronic messaging server upon completion of the conversion process.

One or more modification options may also be applied to the selected file. A user indication to modify the selected file may be transmitted from the electronic messaging device to the electronic messaging server. In that regard, the electronic messaging server, upon receipt of the user indication to modify the selected file, receives file modification options that are available for the selected file from the cloud server, and provides the available file modification options for display in a graphical user interface of the electronic messaging application.

The electronic messaging application may provide a third user control in the user interface of the electronic messaging application, where the third user control is configured to display the available file modification options. The electronic messaging application may receive a user selection of the one of the file modification options via the third user control and transmit the user selected modification option to the electronic messaging server. In one example, modification options of an image file include modifying image resolution of the selected cloud-based image file. In another example, modification options of a file includes modifying content and/or size of the selected file. The selected file is then modified based on the user selected file modification option prior to the selected file being attached to the electronic message. In one example, the modification process takes place on the electronic messaging server, where the selected file is modified based on the user selected modification option. In another example, the electronic messaging server provides the cloud server with the selected modification option and requests the cloud server to modify the file based on the selected modification setting. The electronic messaging server then requests the cloud server to transfer the modified file to the electronic messaging server upon completion of the modification process.

The electronic messaging server attaches the transferred file to the electronic message in block 212. According to example aspects, the electronic messaging server may host a service for sending electronic messages (e.g., a outgoing mail server of a sending user, etc.) and/or receiving electronic messages (e.g., an incoming mail server of a recipient user, etc.). If the electronic messaging server hosts a service for sending electronic messages, the electronic messaging server may attach the transferred to the electronic message and transmit the electronic message to an incoming mail server of the recipient user. If the electronic messaging server hosts a service for receiving electronic messages, the electronic messaging server may attach the transferred file to the electronic message upon receipt of the electronic message from a outgoing mail server of the sending user.

FIG. 3A illustrates a graphical user interface for an electronic messaging application 302. In FIG. 3A, the electronic messaging application 302 runs on a smartphone device 300 and provides a user interface for providing a file stored on a cloud server. Electronic messaging application 302 has access to a user's electronic messaging account, which is hosted by an electronic messaging server. A different application (e.g., a web browsing application etc.) running on a different type of electronic device (e.g., a desktop computer, a laptop computer, a tablet computer, etc.) may also provide a user interface (e.g., a window, a panel, a pop up, etc.) to interact with the user's electronic messaging account.

The user interface as shown in FIG. 3A displays an input box for recipients of the message 304, an attachment field 306, and a message input box 316. Additional user interfaces may include additional input fields such as Cc field, Bcc field, etc. The user interface also displays a first user control 308. The first user control is configured to transmit a request to the electronic messaging server to provide a list of files that are stored on a cloud server in response to a user action (e.g., a click action, a tap action, a hover action, a swipe action, etc.) with respect to the first user control. The user interface also displays a second user control 310. The second user control is configured to transmit a request to the electronic messaging server to convert a selected file from one file type to another file type in response to a user action (e.g., a click action, a tap action, a hover action, a swipe action, etc.) with respect to the second user control. The user interface also displays a third user control 312. The third user control is configured to transmit a request to the electronic messaging server to modify the selected file in response to a user action (e.g., a click action, a tap action, a hover action, a swipe action, etc.) with respect to the third user control. The user interface as shown in FIG. 3A also contains a user control 314 configured to request the electronic messaging server to transmit the electronic message in response to a user action with respect to the user control. Additional user interfaces may include additional input fields and may include different user controls.

FIG. 3B illustrates the graphical user interface of FIG. 3A, where files stored on a cloud server are displayed in response to a user action with respect to the first user control 308. A pop up window 318 is displayed in response to a user action with respect to the first user control 308. The pop up window 318 may be displayed in any location with respect to the display screen of the smartphone device 300. The pop up window 318 as shown in FIG. 3B contains three image files that are stored on the cloud server 320(a), 320(b), and 320(c) represented here as thumbnail images. The user may select one or more of the three thumbnail images 320(a), 320(b), and 320(c) the user would like to have attached to the electronic message. Upon a user selection of a thumbnail image 320(a), 320(b), or 320(c), the electronic messaging application 302 transmits a request for the electronic messaging server to request the cloud server to transfer the file that corresponds to the selected thumbnail image and to attach the requested file to the electronic message.

Figure 3C:
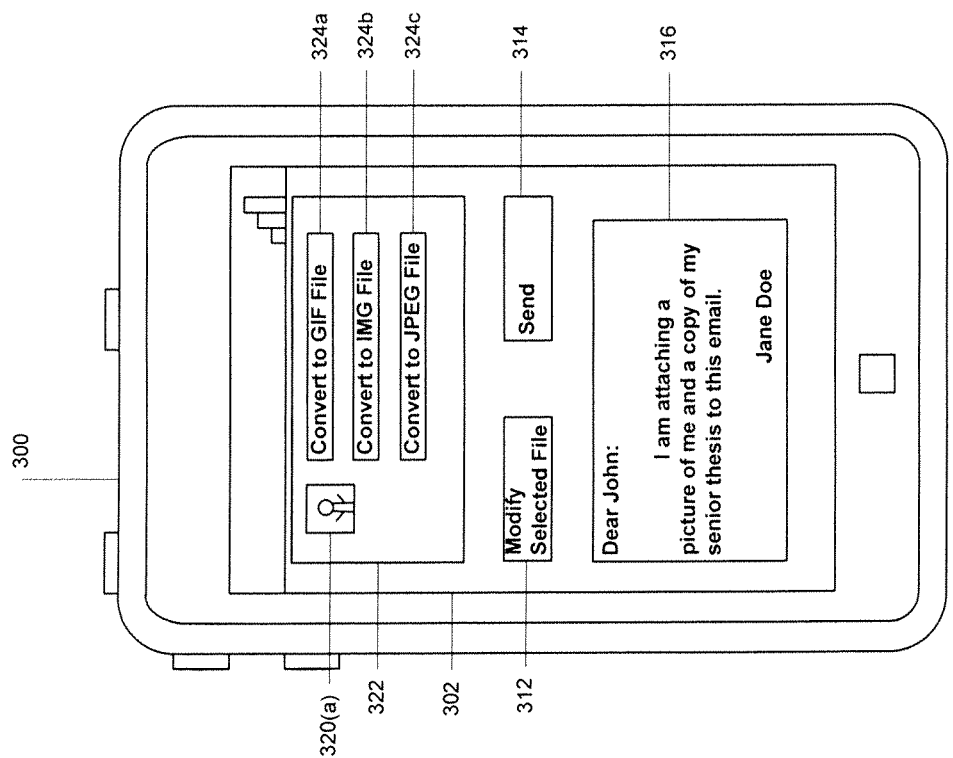
FIG. 3C illustrates the graphical user interface of FIG. 3A, where additional file types for a user selected file are displayed in response to a user action with respect to the second user control.

FIG. 3C illustrates the graphical user interface of FIG. 3A, where additional file types for a user selected file are displayed in response to a user action with respect to the second user control 310. A user interface 322 is displayed in response to a user action with respect to the second user control 310. The user interface 322 as shown in FIG. 3C contains three user controls 324(a), 324(b), and 324(c), that are configured to request the electronic messaging server to convert the selected file 320(a) to an GIF, IMG, or JPEG type file in response to a user action with respect to one of the three user controls 324(a), 324(b), and 324(c). The user interface 322 may contain additional file types based on the selected cloud-file type. For example, in a case where the selected file is a document, user interface 322 may display user controls that are configured to request the electronic messaging server to convert the selected file to a PDF file or a .TXT file in response to a user action with respect to one of the user controls. The user may choose to convert the selected file based on a number of considerations, such as size of the converted file, whether the user wishes the converted file to be edited, whether the converted file is supported by the recipient's electronic device, etc.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
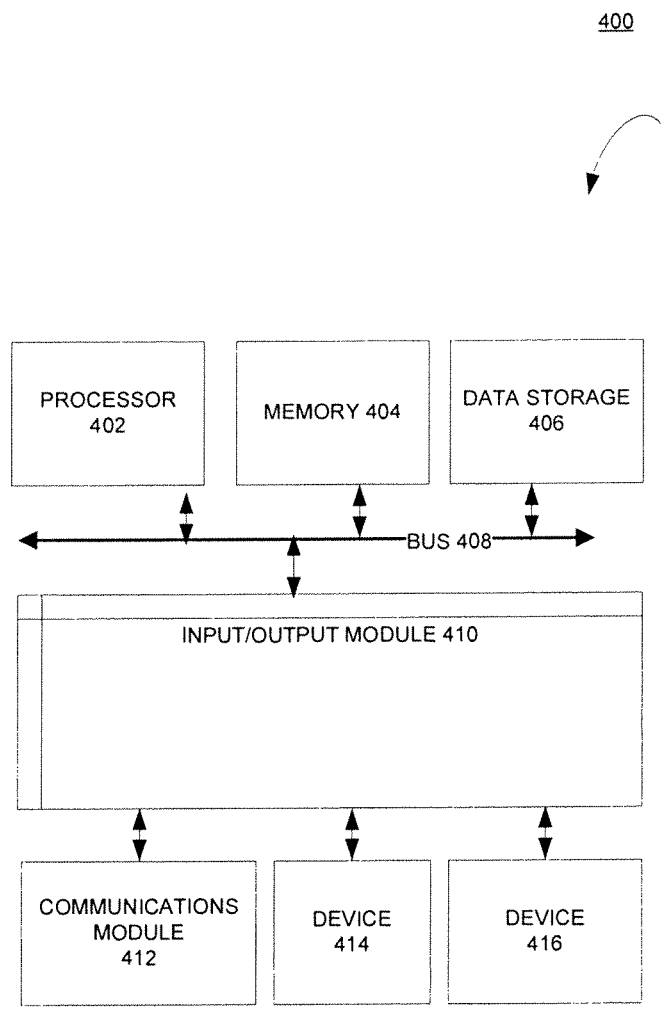
FIG. 4 conceptually illustrates an electronic system with which some implementations of the subject technology are implemented.

FIG. 4 conceptually illustrates an electronic system with which some implementations of the subject technology are implemented. In certain aspects, the computer system 400 may be implemented using hardware or a combination of software and hardware, either in a dedicated server, or integrated into another entity, or distributed across multiple entities.

Computer system 400 (e.g., electronic device 102, 104, and 106 and server 108) includes a bus 408 or other communication mechanism for communicating information, and a processor 402 coupled with bus 408 for processing information. By way of example, the computer system 400 may be implemented with one or more processors 402. Processor 402 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 400 can include, in addition to hardware, code that creates an execution environment for the computer program in question, e.g., code that constitutes processor firmware, a protocol stack, a database management system, an operating system, or a combination of one or more of them stored in an included memory 404, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 408 for storing information and instructions to be executed by processor 402. The processor 402 and the memory 404 can be supplemented by, or incorporated in, special purpose logic circuitry.

The instructions may be stored in the memory 404 and implemented in one or more computer program products, i.e., one or more modules of computer program instructions encoded on a computer readable medium for execution by, or to control the operation of, the computer system 400, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 404 may also be used for storing temporary variable or other intermediate information during execution of instructions to be executed by processor 402.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 400 further includes a data storage device 406 such as a magnetic disk or optical disk, coupled to bus 408 for storing information and instructions. Computer system 400 may be coupled vian input/output module 410 to various devices. The input/output module 410 can be any input/output module. Exemplary input/output modules 410 include data ports such as USB ports. The input/output module 410 is configured to connect to a communications module 412. Exemplary communications modules 412 include networking interface cards, such as Ethernet cards and modems. In certain aspects, the input/output module 410 is configured to connect to a plurality of devices, such as an input device 414 and/or an output device 416. Exemplary input devices 414 include a keyboard and a pointing device, e.g., a mouse or a trackball, by which a user can provide input to the computer system 400. Other kinds of input devices 414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 416 include display devices, such as a CRT (cathode ray tube) or LCD (liquid crystal display) monitor, for displaying information to the user.

According to one aspect of the present disclosure, the electronic device 102, 104, and 106 and server 108 can be implemented using a computer system 400 in response to processor 402 executing one or more sequences of one or more instructions contained in memory 404. Such instructions may be read into memory 404 from another machine-readable medium, such as data storage device 406. Execution of the sequences of instructions contained in main memory 404 causes processor 402 to perform the process steps described herein. One or more processors in a multi-processing arrangement may also be employed to execute the sequences of instructions contained in memory 404. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a computer device having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 110) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 400 can include electronic devices 102, 104, and 106 and servers 108. An electronic device 102, 104, and 106 and server 108 are generally remote from each other and typically interact through a communication network. The relationship of the electronic device 102, 104, and 106 and server 108 arises by virtue of computer programs running on the respective computers and having an electronic device-server relationship to each other. Computer system 400 can be, for example, and without limitation, a touchscreen device, a desktop computer, laptop computer, or tablet computer. Computer system 400 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 402 for execution. Such a medium may take many forms, including, but not limited to, non-volatile media, volatile media, and transmission media. Non-volatile media include, for example, optical or magnetic disks, such as data storage device 406. Volatile media include dynamic memory, such as memory 404. Transmission media include coaxial cables, copper wire, and fiber optics, including the wires that comprise bus 408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A computer-implemented method for selecting a file stored on a cloud server, the method comprising:
    establishing a connection to a cloud server;
    receiving, from the cloud server, a list of files stored on the cloud server;
    providing a first user control for providing the list for display in a graphical user interface of an electronic messaging application, the first user control configured to provide visual indicators for each file of the list of files that are stored on the cloud server in response to a user interaction with the first user control;
    receiving a user selection of a file from the list of files;
    transferring the selected file from the cloud server in response to receiving the selection of the file;
    receiving a list of one or more file types available for conversion of the user selected file;
    providing a second user control, the second user control configured to display the received list of the file types available for conversion in response to a user interaction with the second user control;
    receiving a user selection of one of the one or more file types available for conversion;
    converting the selected file to the selected file type prior to the selected file being attached to the electronic message;
    providing a third user control, the third user control configured to display file modification options for the selected file in response to a user interaction with the third user control, wherein a selectable visual representation of each of the first, second and third user controls are simultaneously displayed on a first application screen of the graphical user interface; and
    attaching the converted file to an electronic message.

2. The computer-implemented method of claim 1, wherein the selected file is transferred to an electronic messaging server that hosts the electronic messaging application, and wherein the transferred file is attached to the electronic message at the electronic messaging server.

3. The computer-implemented method of claim 1, wherein the one or more file types for the user selected file are received in response to a user indication to convert the selected file, and wherein the one or more file types for the user selected file are provided for display in the graphical user interface of the electronic messaging application.

4. The computer-implemented method of claim 1, wherein the converted file type is a JPEG file type or a PDF file type.

5. The computer-implemented method of claim 1, further comprising:
    receiving one or more file modification options for the selected file;
    receiving a user selection of one of the one or more file modification options for the selected file; and
    modifying the file based on the user selected file modification option prior to the selected file being attached to the electronic message.

6. The computer-implemented method of claim 5, wherein modifying the selected file comprises changing an image resolution of the selected file or changing a file size of the selected file.

7. The computer-implemented method of claim 5, wherein the one or more file modification options for the selected file are received in response to a user indication to modify the selected file, and
wherein the one or more file modification options are provided for display in the graphical user interface of the electronic messaging application.

8. An electronic messaging system, the system comprising:
one or more processors, and
a non-transitory machine-readable medium comprising instructions stored therein, which when executed by the processors, cause the processors to perform operations comprising:
establishing a connection to a cloud server;
receiving, from the cloud server, a list of files stored on the cloud server;
providing a first user control for providing the list for display in a graphical user interface of an electronic messaging application, the first user control configured to provide visual indicators for each file of the list of files that are stored on the cloud server in response to a user interaction with the first user control;
receiving a user selection of a file from the list of files;
transferring the selected file from the cloud server in response to receiving the selection of the file;
receiving a list of one or more file types available for conversion of the user selected file;
providing a second user control, the second user control configured to display the received list of the file types available for conversion in response to a user interaction with the second user control;
receiving a user selection of one of the one or more file types available for conversion;
converting the selected file to the selected file type;
providing a third user control, the third user control configured to display file modification options for the selected file in response to a user interaction with the third user control, wherein a selectable visual representation of each of the first, second and third user controls are simultaneously displayed on a first application screen of the graphical user interface; and
attaching the converted file to an electronic message.

9. The system of claim 8, wherein the selected file is transferred to an electronic messaging server that hosts the electronic messaging application, and wherein the transferred file is attached to the electronic message at the electronic messaging server.

10. The system of claim 8, wherein the converted file type is a JPEG file type or a PDF file type.

11. The system of claim 8, wherein the operations further comprise:
receiving one or more file modification options for the selected file;
receiving a user selection of one of the one or more file modification options for the selected file; and
modifying the file based on the user selected file modification option prior to the selected file being attached to the electronic message.

12. The system of claim 11, wherein modifying the selected file comprises changing an image resolution of the selected file or changing a file size of the selected file.

13. The system of claim 11, wherein the one or more file types for the user selected file are received in response to a user indication to convert the selected file, and wherein the one or more file types for the user selected file are provided for display in the graphical user interface of the electronic messaging application.

14. A non-transitory machine-readable medium comprising instructions stored therein, which when executed by a system, cause the system to perform operations comprising:
establishing a connection to a cloud server;
receiving, from the cloud server, a list of files stored on the cloud server;
providing a first user control for providing the list for display in a graphical user interface of an electronic messaging application, the first user control configured to provide visual indicators for each file of the list of files that are stored on the cloud server in response to a user interaction with the first user control;
receiving a user selection of a file from the list of files;
transferring the selected file from the cloud server in response to receiving the selection of the file;
receiving a list of one or more file types available for conversion of the user selected file;
providing a second user control, the second user control configured to display the received list of the file types available for conversion in response to a user interaction with the second user control;
receiving a user selection of one of the one or more file types available for conversion;
converting the selected file to the selected file type;
providing a third user control, the third user control configured to display file modification options for the selected file in response to a user interaction with the third user control, wherein a selectable visual representation of each of the first, second and third user controls are simultaneously displayed on a first application screen of the graphical user interface; and
attaching the converted file to an electronic message.

15. The machine-readable medium of claim 14, wherein the converted file type is a JPEG file type or a PDF file type.

16. The machine-readable medium of claim 14, wherein the operations further comprise:
receiving one or more file modification options for the selected file;
receiving a user selection of one of the one or more file modification options for the selected file; and
modifying the file based on the user selected file modification option prior to the selected file being attached to the electronic message.

17. The machine-readable medium of claim 16, wherein modifying the selected file comprises changing an image resolution of the selected file or changing a file size of the selected file.

18. The machine-readable medium of claim 16, wherein the selected file is transferred to an electronic messaging server that hosts the electronic messaging application, and wherein the transferred file is attached to the electronic message at the electronic messaging server.

19. The machine-readable medium of claim 16, wherein the one or more file modification options for the selected file are received in response to a user indication to modify the selected file, and
wherein the one or more file modification options are provided for display in the graphical user interface of the electronic messaging application.

* * * * *